J. R. McWANE.
MACHINE FOR MAKING SAND CORES FOR PIPES AND OTHER HOLLOW CASTINGS.
APPLICATION FILED APR. 9, 1909.
954,876.
Patented Apr. 12, 1910.
9 SHEETS—SHEET 6.
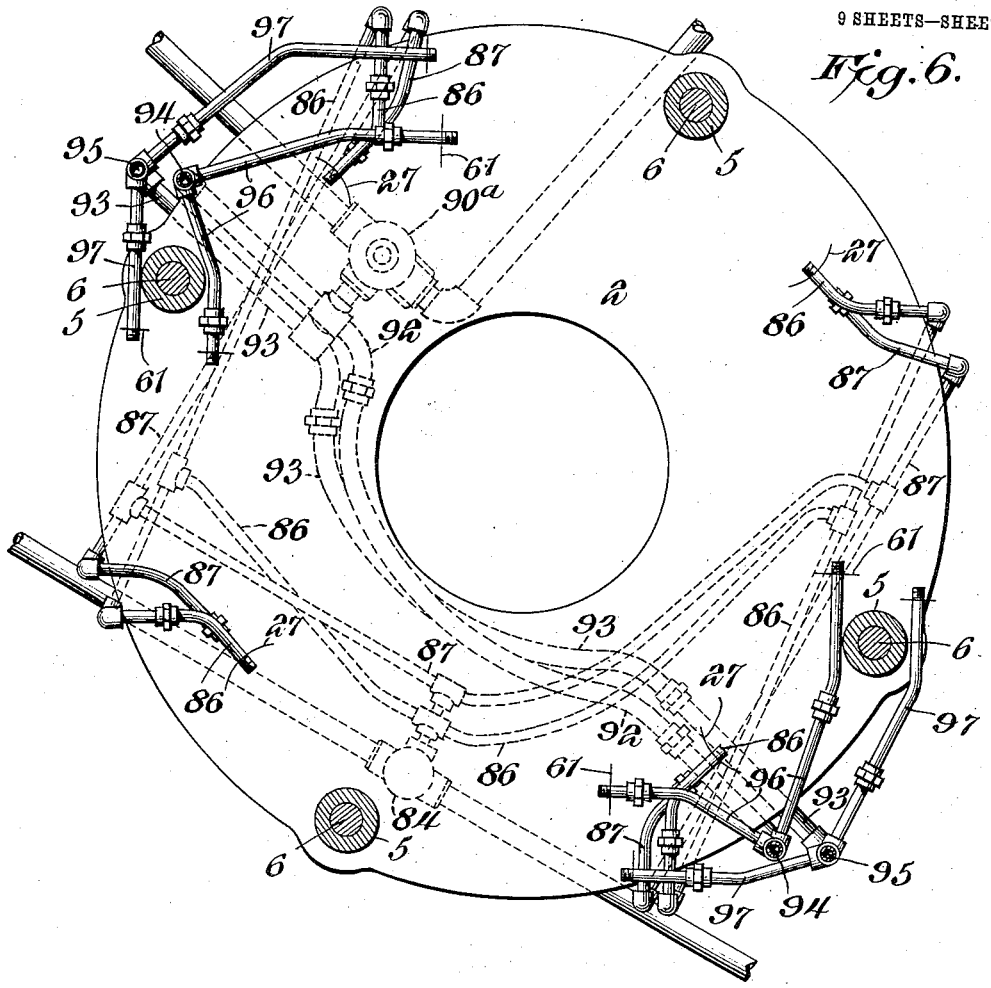
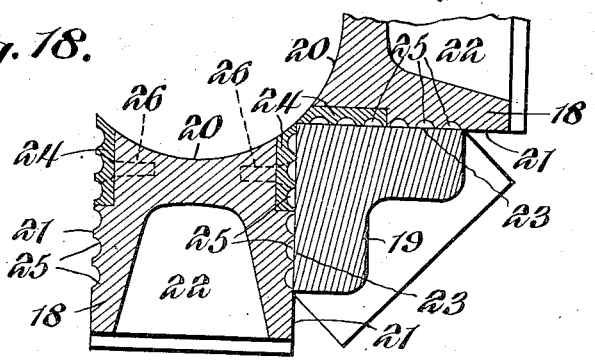
Witnesses
Howard D. Orr.
H. T. Riley
James R. McWane, Inventor,
By C. G. Siggers
Attorney

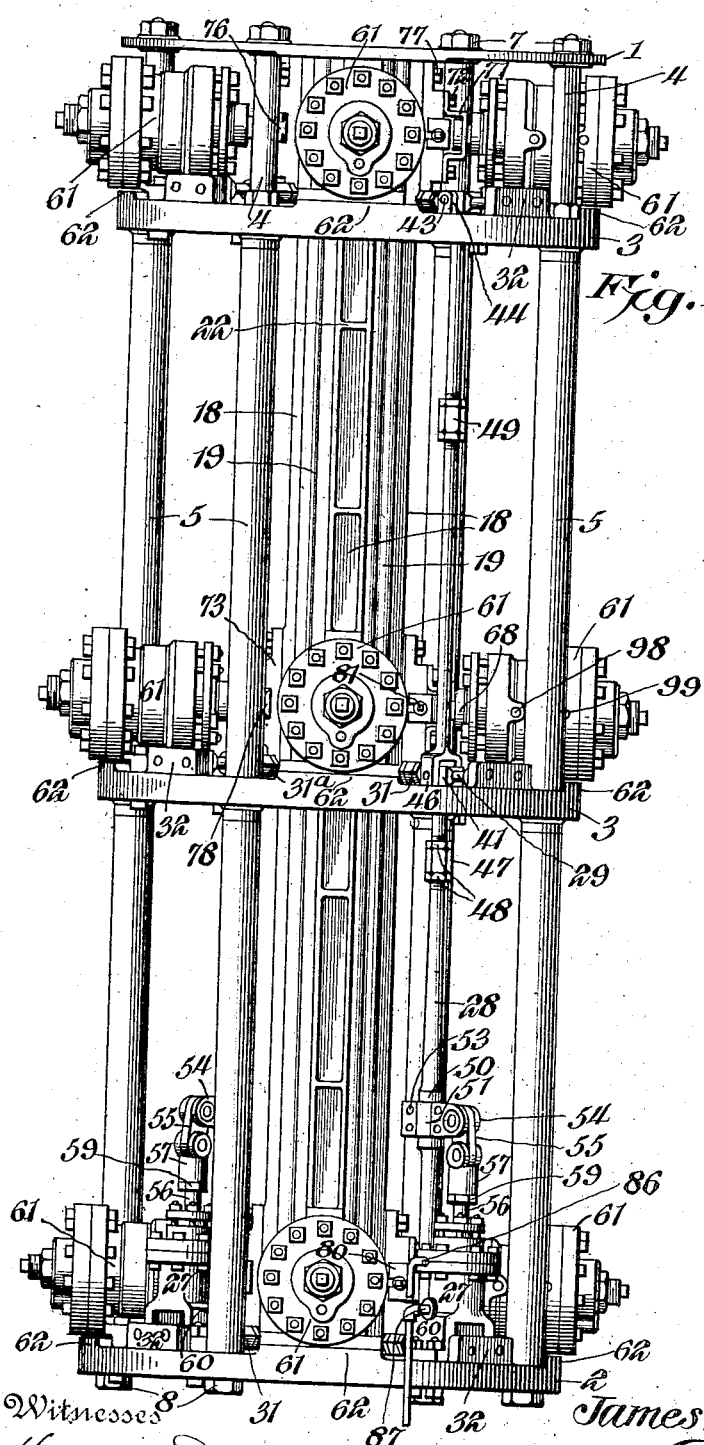

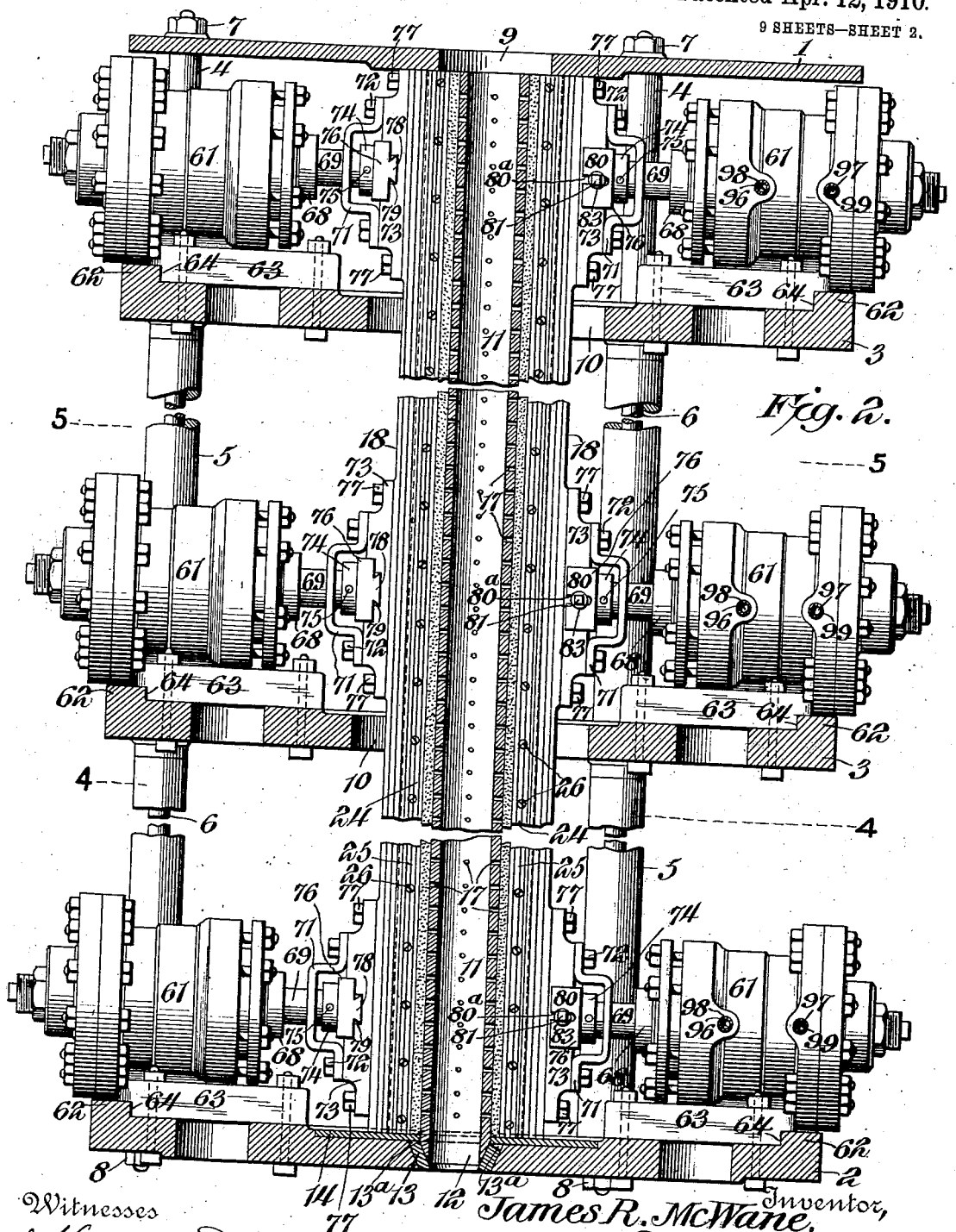

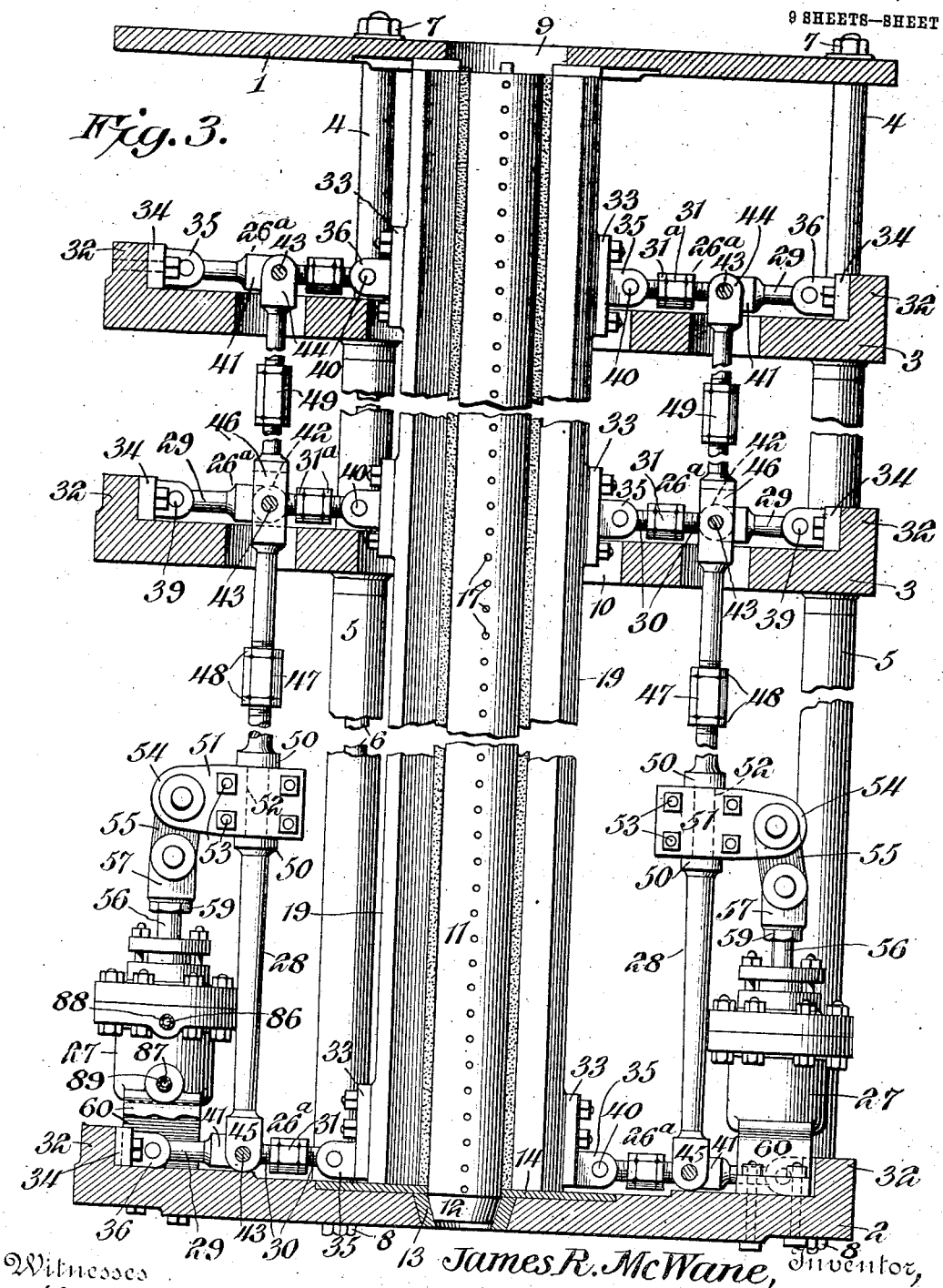

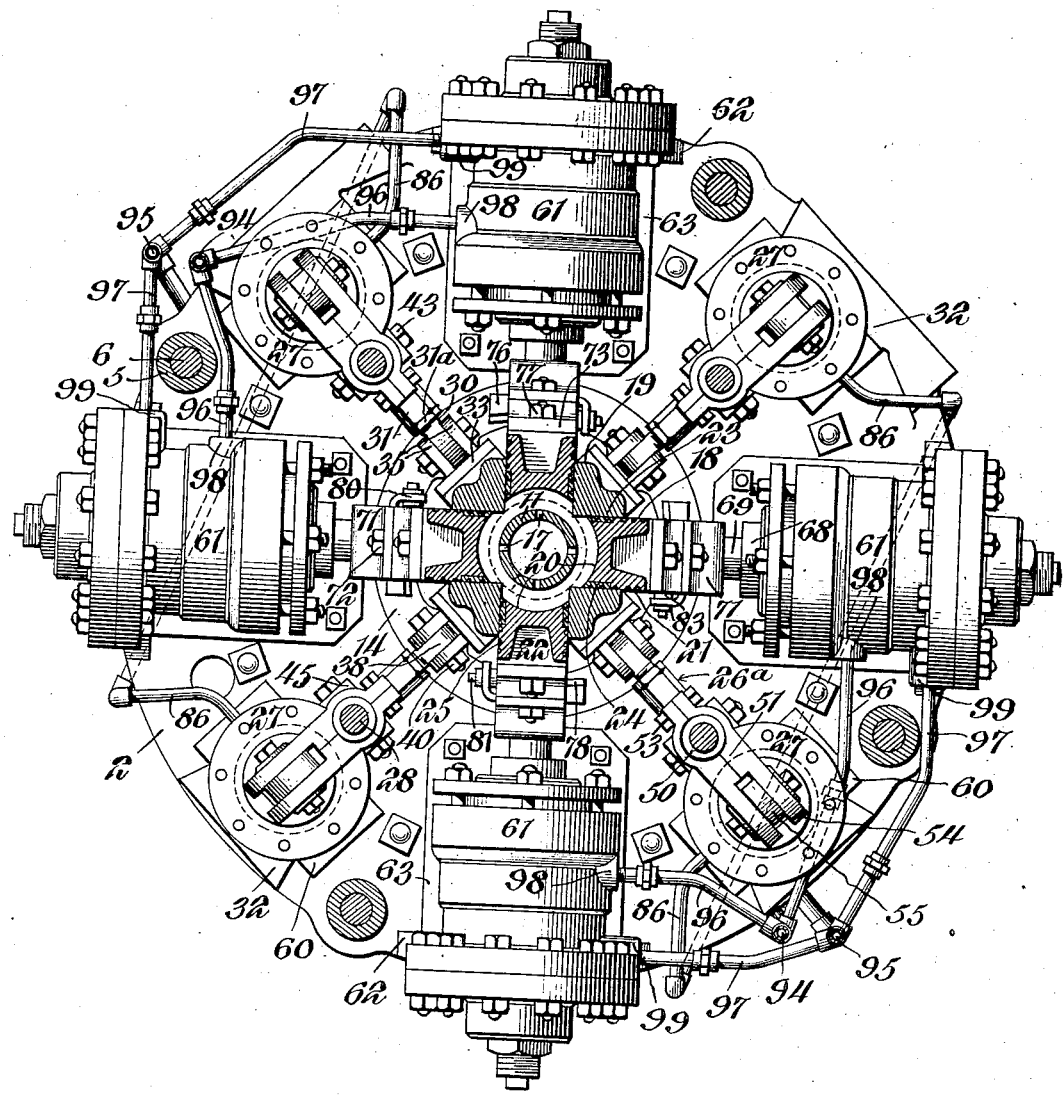

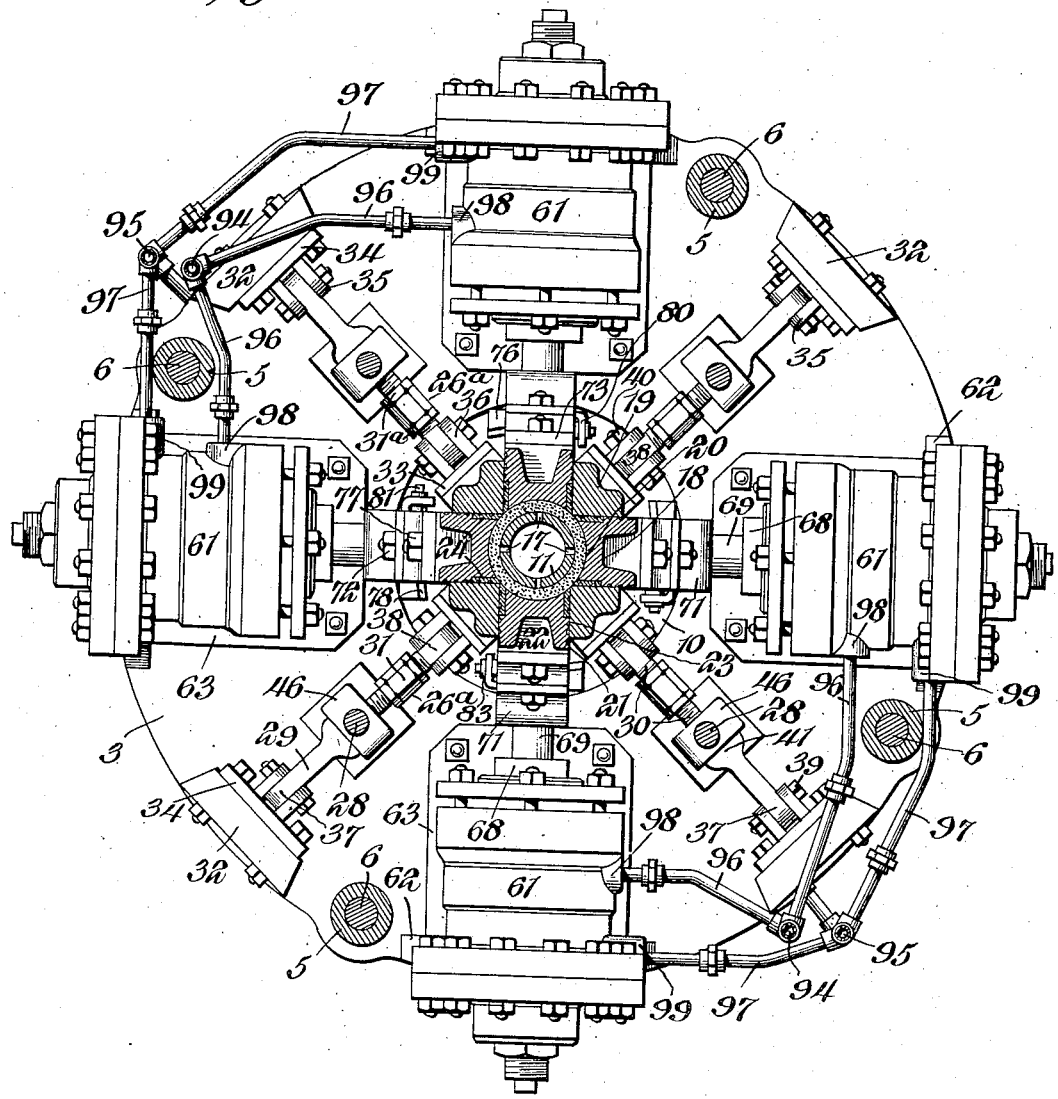

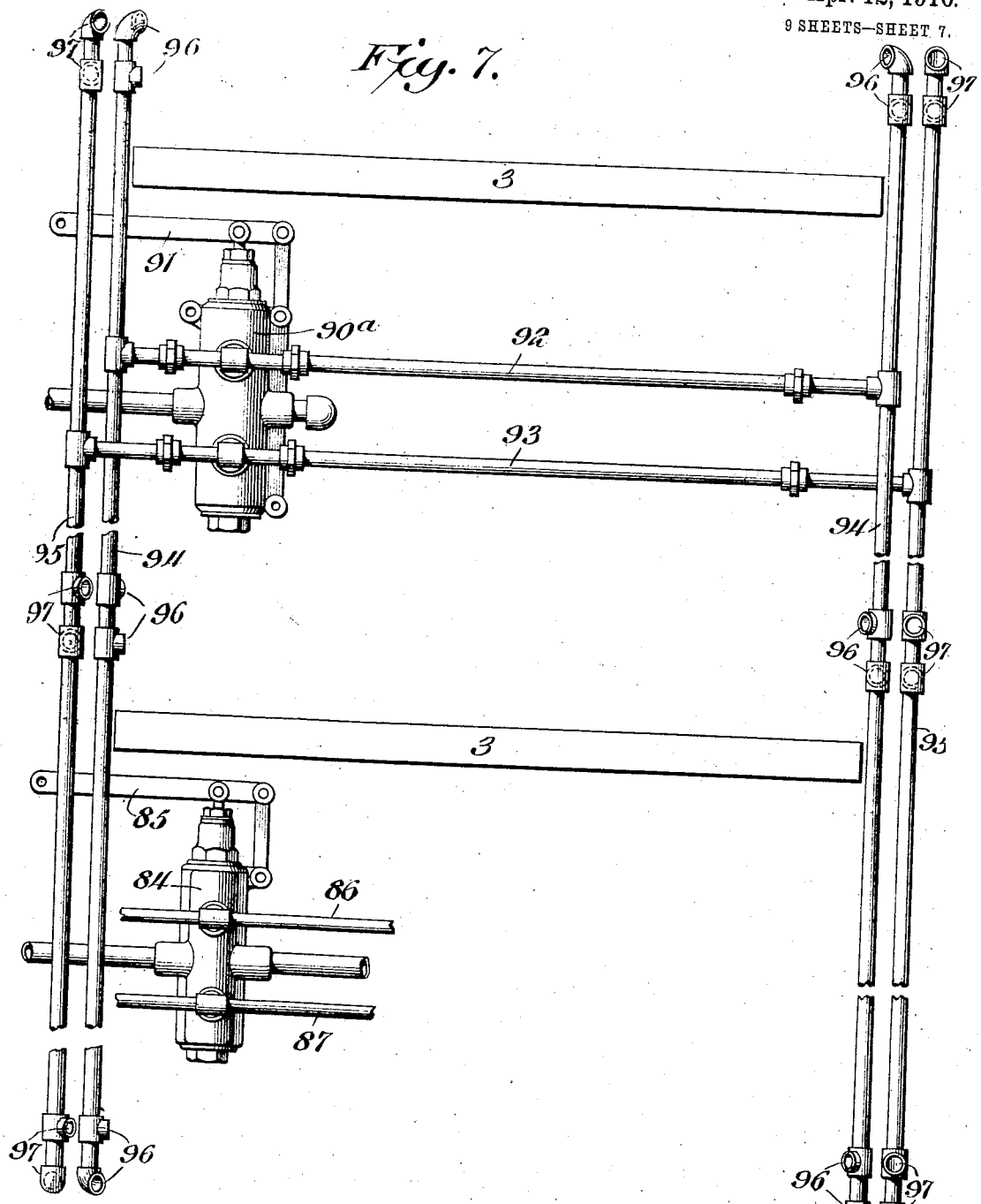

J. R. McWANE.
MACHINE FOR MAKING SAND CORES FOR PIPES AND OTHER HOLLOW CASTINGS.
APPLICATION FILED APR. 9, 1909.
954,876.
Patented Apr. 12, 1910.
9 SHEETS—SHEET 8.
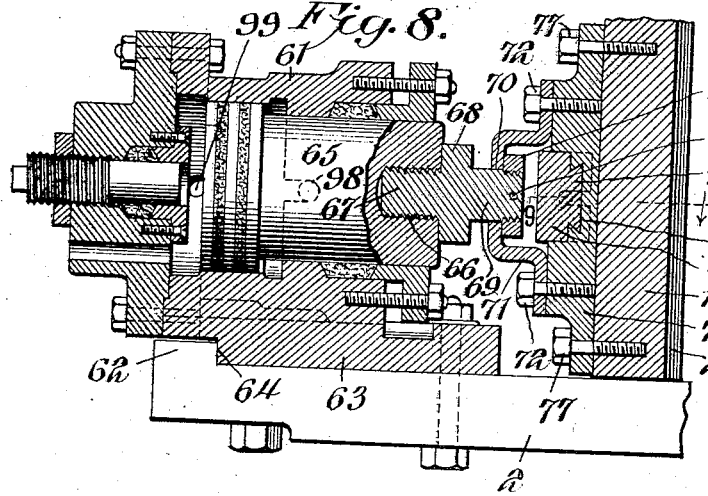
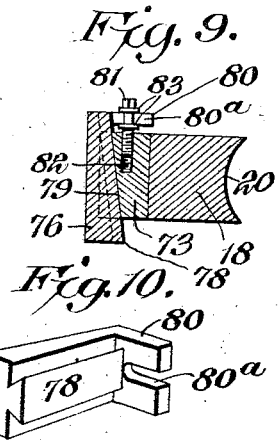
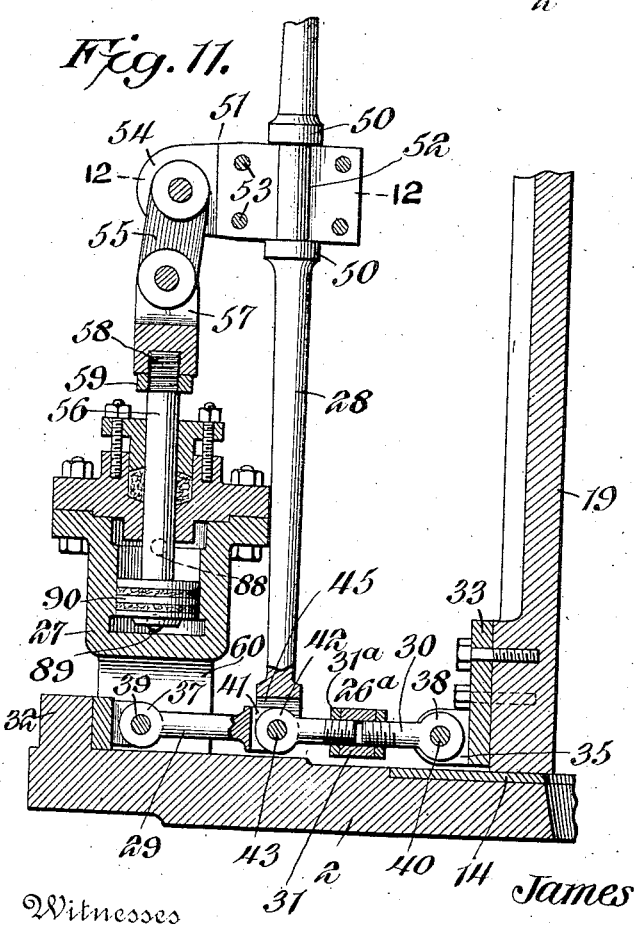
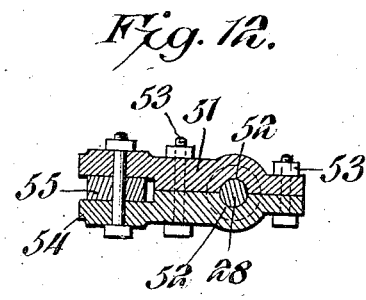
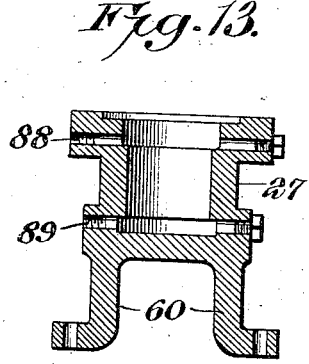
Witnesses
Howard D. Orr
N. T. Riley
James R. McWane, Inventor,
By E. G. Siggers
Attorney J. R. McWANE.
MACHINE FOR MAKING SAND CORES FOR PIPES AND OTHER HOLLOW CASTINGS.
APPLICATION FILED APR. 9, 1909.

954,876.

Patented Apr. 12, 1910.
9 SHEETS—SHEET 9.

Witnesses
Howard D. Orr
N. F. Riley

Inventor,
James R. McWane
By
E. G. Siggers
Attorney

UNITED STATES PATENT OFFICE.

JAMES R. McWANE, OF BIRMINGHAM, ALABAMA.

MACHINE FOR MAKING SAND CORES FOR PIPES AND OTHER HOLLOW CASTINGS.

954,876.  Specification of Letters Patent. Patented Apr. 12, 1910.

Application filed April 9, 1909. Serial No. 488,894.

*To all whom it may concern:*

Be it known that I, JAMES R. McWANE, a citizen of the United States, residing at Birmingham, in the county of Jefferson and State of Alabama, have invented a new and useful Machine for Making Sand Cores for Pipes and other Hollow Castings, of which the following is a specification.

The invention relates to improvements in sand core making machines.

The object of the present invention is to improve the construction of said core making machines, and to provide a simple, efficient and comparatively inexpensive core making machine, capable of expeditiously manufacturing sand cores in a vertical position and in the pits where the pipes or other castings are molded, thereby reducing the cost of constructing the cores and lessening the handling thereof.

A further object of the invention is to provide a machine of this character, capable of producing a sand core of uniform hardness, thereby obviating the danger of breaks in the core and consequent loss in casting, or roughness of the interior of the pipe.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 14:
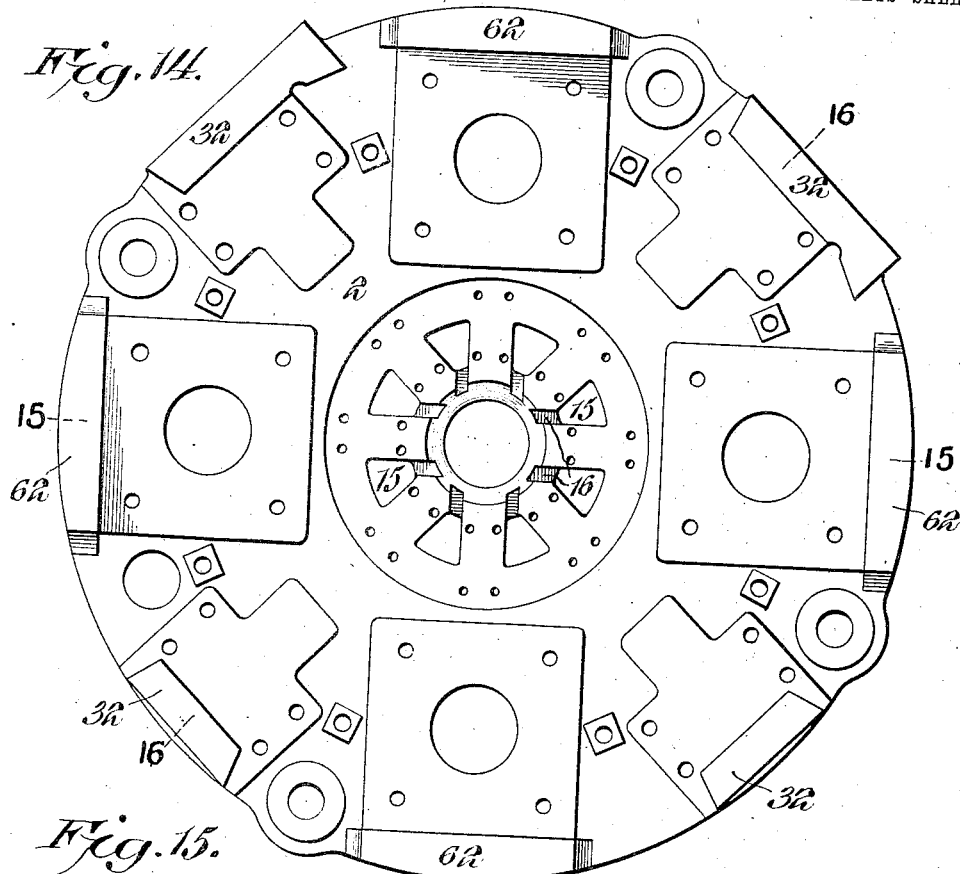
Figure 15:
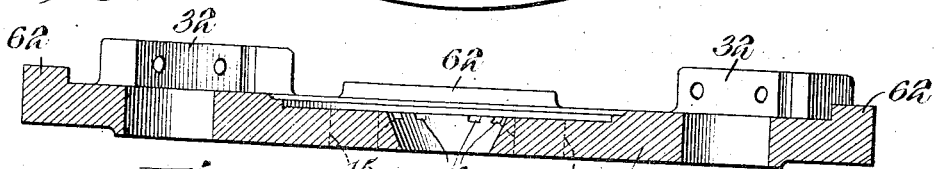
Figure 16:
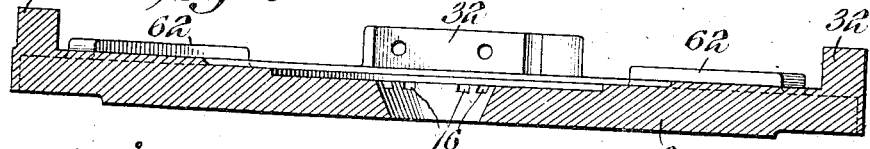
Figure 17:
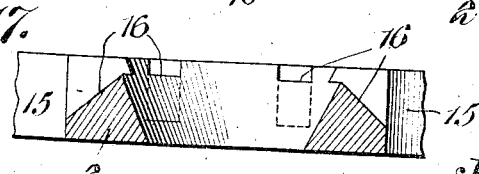

In the drawings:—Figure 1 is a side elevation of a core making machine, constructed in accordance with this invention. Fig. 2 is a vertical sectional view, taken diametrically of the machine, the horizontal cylinders being in elevation. Fig. 3 is a vertical sectional view, taken diagonally of the machine, the vertical cylinders being in elevation. Fig. 4 is a horizontal sectional view, taken substantially on the line 4—4 of Fig. 2 and illustrating the arrangement of the parts on the bottom or bed plate. Fig. 5 is a similar view, taken substantially on the line 5—5 of Fig. 2 and illustrating the arrangement of the parts on one of the intermediate plates. Fig. 6 is a horizontal sectional view, illustrating the arrangement of the pipe connections for operating the vertical and horizontal cylinders. Fig. 7 is an elevation, illustrating the arrangement of the pressure controlling valves and the pipe connections. Fig. 8 is a vertical sectional view of one of the horizontal cylinders and showing the connection between the same and its compressing member. Fig. 9 is a detail sectional view, taken substantially on the line 9—9 of Fig. 8, and illustrating the construction of the adjustable abutment of the compressing member. Fig. 10 is a detail view, illustrating the construction for adjusting the movable abutment of the compressing member. Fig. 11 is a vertical sectional view of one of the vertical cylinders and the lower toggle connection between the same and the adjacent angle member. Fig. 12 is a detail sectional view on the line 12—12 of Fig. 11. Fig. 13 is a detail sectional view, illustrating the construction of the body portion of the vertical cylinders. Fig. 14 is a plan view of the bottom or bed plate. Fig. 15 is a sectional view on the line 15—15 of Fig. 14. Fig. 16 is a similar view on the line 16—16 of Fig. 14. Fig. 17 is a detail sectional view of the central portion of the bed or bottom plate, illustrating the construction of the grooves or openings for the escape of the same. Fig. 18 is an enlarged detail sectional view, illustrating the construction of the angle members and the compressing members of the core box. Fig. 19 is a detail view of one of the vertical toggle actuating connecting rods.

Like numerals of reference designate corresponding parts in all the figures of the drawings.

The frame of the machine comprises in its construction top, bottom and intermediate horizontal plates 1, 2 and 3, spaced apart by vertical tubes or sleeves 4 and 5 and connected with each other by vertical rods 6, passing through the tubes and piercing the horizontal plates 1, 2 and 3 and having their upper and lower ends threaded for the reception of nuts 7 and 8. The horizontal plates, which are preferably circular, form platforms for supporting the actuating mechanism of the machine, and the tubes or sleeves 5, which are interposed between the intermediate plates 3 and between the bottom plate 2 and the adjacent intermediate plate, are of greater diameter than the tubes or sleeves 4, which support the top plate.

The top and intermediate plates are provided with central openings 9 and 10, which provide a central open space within the machine for a core bar or barrel 11, and the latter is supported in a vertical position by having its lower end 12 fitted in a socket of the bottom or bed plate 2. The plates may also be provided at intervals, as shown, with openings to reduce the weight of the machine. The lower end of the core bar is exteriorly tapered, and the bed or bottom plate 2 has a socket consisting of a central downwardly tapered opening in which a tapering bushing 13 is fitted. The bushing, which is adapted to receive the wear, has an interior taper to fit the lower end of the core bar, and it is adapted to be removed and replaced by a new bushing without discarding the bottom or bed plate. The upper face of the bottom or bed plate is centrally recessed and is equipped with a circular face plate 14 of steel or other suitable material having its upper face arranged in flush relation with the adjacent portions of the upper surfaces of the bottom or bed plate. The face plate is provided at the socket with a central opening, and it projects over and engages the upper edge of the said bushing to retain the same in place. The removable face plate and the bed plate are pierced to provide an annular series of inwardly tapered approximately sector-shaped openings 15, and grooves 16 extend inwardly from the inner ends of the openings to the upper edges of the bushing, which is provided with notches 13ª forming continuations of the grooves. The grooves 16 have inclined bottoms and form an annular series of chutes or passages for the escape of any sand accumulating on the central portion of the plate after the removal of a sand core.

The core bar or barrel 11 is provided at intervals with perforations 17 for the escape of gases given off during the operation of molding. The core bar previous to its introduction into the machine is coated with clay wash, or other adhesive material to cause the sand to adhere to it, and the machine is equipped with a core box composed of spaced sand compressing members 18 and intervening sand confining members 19, arranged vertically at the center of the machine and constituting the walls of the core box and forming a chamber for the reception of the core bar and the sand. The sand compressing members are diametrically arranged and are movable inwardly and outwardly diametrically of the machine to compress the sand around the core bar, while the other sections 19 are diagonally arranged and are movable inwardly and outwardly in diagonal directions to arrange them in position and to withdraw them for carrying their sharp corners, hereinafter described, clear of the core so as not to break the sand or otherwise injure the core.

The sand compressing members are provided with arcuate inner faces 20 and they have straight flat side faces 21, arranged in parallelism. The outer or rear faces of the sand compressing members or sections are recessed or hollowed out to form opposite sides and a connecting inner portion to lighten the sections or members, the latter being of a flanged construction, as shown, to secure a maximum strength with a minimum amount of metal. They are also provided at intervals with horizontal webs 22, which connect the sides. The inner arcuate faces form a complete circle when the sections or members are at the limit of their inward movement, as illustrated in Fig. 5 of the drawings, and they press and pack the sand around the core bar and provide a smooth compact sand core bar, the pressure and the adhesive coating of the core bar causing the sand to adhere perfectly and enabling a true core to be constructed to within a short distance of the extreme upper ends of the sections or members. In practice the sections or members will be of a length slightly in excess of the length of the pipe to be molded, so that in event of any slight imperfection in the sand at the extreme top of the machine, a perfect core of the desired length for molding the pipe will be produced.

The sections or members 19 are approximately triangular in cross section and have inner sharp corners and flat side faces 23, which are presented to the flat side faces of the sand compressing members. The side faces 23 of the angle members are arranged in parallelism with the side faces of the adjacent angle members, and when the latter are at the limit of their inward movement, the intervening spaces between the angle members are just sufficient in width to provide the passage-ways for the sand compressing members. The angle members close the spaces between the sand compressing members and coöperate with the same in confining the sand around the core bar.

In the formation of a sand core, the corner or angle members are first moved inward to arrange them in position. The sand is then delivered to the core chamber by any suitable means and the compressing members are then moved inward to press the sand around the core bar. Preparatory to removing the completed core from the machine, the corner members are first moved outward to carry their sharp angles clear of the core, and then the compressing members are moved away from the core to release the same. The completed core may then be removed from the machine without injury, and in practice the core may be lifted out of the machine by means of a crane, or the machine may be connected at the bottom with hydraulic, or other means for moving it downward from the core, which is then blacked and dried. By constructing the sand cores in this manner they may be made in the pits where the pipes are molded, which will greatly reduce the cost of manufacture and will also lessen the handling of the cores and the liability of injuring the same.

The sand compressing members are provided at their side faces with wear plates 24, secured in recesses of the compressing members and extending inward from the curved engaging faces thereof and forming continuations of the same. The side faces of the compressing members are also equipped with vertical grooves or channels 25, adapted to permit sand or grit to escape from between the flat faces of the contiguous members, thereby reducing the friction and the wear to a minimum. These grooves or channels 25 are formed in the wear plates as well as in the adjacent portions of the side faces of the compressing members. The plates 24, which receive the greatest amount of friction and the wear, are detachably secured in the side recesses of the compressing members by screws 26, and are adapted to be readily replaced when worn.

Each of the spaced angle members is moved inward and outward, and is held stationary at the limit of its inward movement by mechanism comprising a plurality of toggles 26ª, a vertical cylinder 27 and a vertical connecting rod 28, operated by the cylinder 27 and connected with each of the toggles and adapted to simultaneously straighten or break the same, whereby the angle bar is moved inward and outward in a vertical position. The vertical cylinders are operated by hydraulic fluid pressure, and are connected together as hereinafter fully explained, whereby a simultaneous inward and outward movement of the angle members is effected. Each toggle 26ª comprises an outer lever 29 and an inner lever composed of two screws 30 and a connecting nut 31, having right and left hand threads and adapted to adjust the screws to vary the length of the toggles for maintaining the angle lever in its perpendicular position and to arrange the angle member the desired distance from the center of the machine, when the said angle member is at the limit of its inward movement. The parts are secured in their adjustment by means of jam nuts 31ª, arranged at the ends of the connecting nut. The toggles are located at the upper faces of the horizontal plates and at the upper sections of the bottom and intermediate plates 2 and 3, which are provided with integral upstanding portions 32, forming shoulders for the outer ends of the toggles. The inner and outer ends of the toggles are connected with the angle members and with the upwardly extending portions 32 of the plates 2 and 3 by means of brackets 33 and 34, provided with spaced ears 35 and 36 between which are pivoted eyes 37 and 38 of the toggles by pins 39 and 40, arranged in registering openings of the eyes and the ears. The toggle lever 29 is provided at its inner end with spaced ears 41, receiving an eye 42 of the adjacent screw of the inner toggle lever 30, the parts being connected by a pivot or pin 43, which also connects the toggle lever with the connecting rod 28.

The connecting rod, which extends through suitable openings of the intermediate plates, is provided at its upper and lower ends with spaced ears 44 and 45, which receive the top and bottom toggles, and it has an intermediate opening 46 in which the intermediate toggle is pivoted. The connecting rod is constructed in sections and is provided between the bottom plate and the adjacent intermediate plate with an adjustable connection, consisting of a nut 47 having right and left hand threads and receiving right and left hand threaded portions of the adjacent sections, which are also equipped with jam nuts 48 for securing the parts in their adjustment. The connecting rod is also provided between the intermediate plates with an adjustable connection 49, constructed similar to that heretofore described. The adjusting devices of the connecting rod enable the toggles to be properly adjusted. The lowermost section of the connecting rod is provided with spaced collars 50, forming opposite shoulders and receiving between them a sectional arm 51, consisting of plates having opposite grooves 52 to provide an opening for the connecting rod and secured together by means of bolts 53, arranged in pairs at opposite sides of the connecting rod. The outer portions 54 of the plates are spaced apart to receive the upper end of a link 55, which connects the arm with the piston 56 of the vertical cylinder 27. The ends of the link 55 are pivoted to the arm 51 and to the piston, which is equipped at its upper end with a yoke 57. The sides of the yoke receive the lower end of the link, and the bottom of the yoke is provided with a threaded socket for the reception of the upper end 58 of the piston 56, which is also threaded and which receives a jam nut 59 for engaging the yoke 57.

When the piston is moved upward by the means hereinafter described, it carries with it the connecting rod and operates through the same to break the toggles and withdraw the angle member from its operative position in the formation of a sand core, and when the piston is moved in the opposite direction, the toggles are straightened and the angle member is moved inward to its operative position, the toggles limiting the inward movement of the angle lever and also operating to lock the same against outward movement. The cylinders 27, which may be of any preferred construction, are provided at their lower ends with spaced legs 60, which straddle the outer portions of the toggles. The legs 60, which support the cylinders above the horizontal plates, are substantially L-shaped, the lower portions forming feet and being bolted or otherwise secured to the horizontal plates.

The pressure is applied to the compressing members by means of a plurality of horizontal cylinders 61, arranged at intervals and mounted upon the bottom and intermediate horizontal plates. The horizontal plates are provided with upwardly extending portions 62, forming shoulders or stops against which fit bed plates 63 of the horizontal cylinders. Each horizontal cylinder, which may be of any preferred construction, is preferably provided with the bed plate 63, formed integral with the cylinder and bolted or otherwise secured to the horizontal supporting plates 2 and 3 of the frame of the machine. The outer ends of the bed plates 63 are recessed at 64 to receive the inner edge of the upwardly extending portions 62 of the supporting plates 2 and 3. Three cylinders are employed for actuating each of the sand compressing members, but their number may be varied with the size of the compressing member, as will be readily understood. Each cylinder is equipped with a horizontally movable plunger 65, provided with a threaded socket 66 for the reception of a screw 67, which loosely connects the plunger with the compressing member. The screw 67 is provided at an intermediate point with a head 68, which fits against the end of the plunger 65. The outer portion of the screw is threaded from the terminal to the head 68 and extends into the socket 66. The inner portion 69 of the screw extends through an opening 70 of a bracket 71, consisting of an intermediate substantially U-shaped portion and terminal attaching portions, which are secured by screws 72, or other suitable fastening devices to a block 73. The terminal of the inner portion or stem 69 of the screw is threaded for the reception of a nut 74, located within the bracket and arranged to engage the same, when the plunger moves outward to withdraw the sand compressing member from the sand core. The nut 74 is held against rotary movement by means of a pin or key 75, and when the plunger is at the limit of its outward movement, as illustrated in Fig. 8 of the drawings, the nut 74 is in contact with the inner face of the bracket 71. The head 68 is then spaced from the bracket and when the plunger is moved inward it has a limited travel before the inner end of the screw engages an adjustable abutment 76. This limited movement of the plunger enables the same to be put in motion before pressure is applied to the compressing member, so that the full effect of the motive power is obtained. The block 73 is mounted on the compressing member, being secured to the same by upper and lower screws 77.

The adjustable abutment is wedge-shaped, as illustrated in Fig. 9 of the drawings, and it is provided with a dove-tailed inner portion 78, which slides in a dove-tailed groove or way 79 of the block 73. The block 73 is grooved to receive the adjustable abutment, and it presents angularly disposed faces to the same. The wedge-shaped abutment is provided at its smaller end with an inwardly extending vertically disposed lip or flange 80 to which is connected an adjusting screw 81, having a polygonal outer portion and provided with a threaded inner portion, engaging a threaded opening or socket 82 of the block 73. The lip or flange 80 is provided with a horizontal slot or bifurcation 80ª, and the screw 81 has a smooth portion to operate in the said slot or bifurcation 80ª, and it is provided with spaced collars or shoulders 83 engaging the inner and outer faces of the lip or flange 80 and preventing longitudinal movement of the screw through the slot or opening 80ª. This connection between the screw and the lip or flange, however, permits the latter to have the necessary inward and outward movement incident to the longitudinal movement of the wedge-shaped abutment. When the adjusting screw 81 is rotated, the abutment, which is in the form of a solid block, is moved horizontally and its outer face is carried inward or outward with respect to the compressing member. This enables the sand compressing members to be accurately positioned with relation to the plunger, so that the said compressing members will form a true circle and occupy the desired position at the limit of their inward movement.

The cylinders are provided with opposite ports for enabling the pipes to be coupled to them at either side, and the ports or openings not in use are plugged in the usual manner. The vertical cylinders are simultaneously operated by a controlling valve 84, equipped with a suitable operating lever 85 and having upper and lower pipe connections 86 and 87. The upper pipe connections 86 extend in opposite directions from the valve 84 and are coupled to the vertical cylinders at the upper ports 88 thereof, while the lower pipes 87, which are similarly arranged, are coupled to the vertical cylinders at the lower ports 89. The upper ports admit the fluid pressure to the cylinder above the piston head 90, and the lower ports 89 admit the fluid pressure beneath the said piston heads 90. The pipes 86 and 87 alternately become feed and exhaust pipes according to the position of the valve 84. When fluid pressure is permitted to flow through the upper pipes 86 to the upper portions of the vertical cylinders, the other pipes 87 become exhaust pipes and permit the fluid to flow from the lower portions of the cylinders 27. This operates to straighten the toggles and move the angle members inward. When fluid pressure is permitted to flow through the pipe connections 87 to the lower portions of the vertical cylinders 27 for raising the piston to break the toggles, the upper pipes 86 operate as exhaust pipes and permit the fluid to flow from the upper portions of the vertical cylinders.

The horizontal plungers are simultaneously operated by a controlling valve 90ᵃ, equipped with an operating lever 91 and constructed similar to the valve 84 with the exception that the valve 90ᵃ is larger than the valve 84, as it must possess sufficient capacity to control the admission of the fluid to and escape of the same from the horizontal cylinders, which are located at the bottom horizontal plate and also at the intermediate horizontal plates, whereas only one set of vertical cylinders is employed. Any desired construction of controlling valve may be employed, and as the particular construction thereof does not constitute any portion of the present invention, detail illustration and description of the same are deemed unnecessary.

The controlling valve 90ᵃ is connected by upper and lower pipes 92 and 93 with vertical or riser pipes 94 and 95, extending from the bottom supporting plate to a point above the upper intermediate plate and provided adjacent to the bottom and intermediate supporting plates with couplings, arranged in pairs. The couplings of the pipe 94 receive pipes 96, which extend to the inner ends of the horizontal cylinders, and the riser pipes 95 are connected by pipes 97 with the outer ends of the horizontal cylinders. The pipes 92 and 93 and their respective connections with the inner and outer ends of the horizontal cylinders alternately become feed and exhaust pipes, and when one set of pipe connections is used for conducting fluid pressure to one end of the horizontal cylinders, the other set is operating as exhaust pipes for permitting the fluid pressure to escape from the opposite ends of the horizontal cylinders. By this construction the plungers of the horizontal cylinders are simultaneously operated to move the sand compressing members of the core box inward or outward. The horizontal cylinders are provided with inner ports or openings 98 with which the pipes 96 are connected, and the outer ends of the cylinders are provided with ports or openings 99 to which the pipes 97 extend. The position of the pipe connections may be varied to arrange them out of the way and in the most advantageous place, and their number and arrangement will vary with the number of cylinders with which a machine may be equipped, for while the number and arrangement illustrated in the accompanying drawings is designed for casting gas and water pipes, yet it will be apparent that the number of sections or members of the core box and the number and arrangement of cylinders for operating the sections or members of the core box may be varied to adapt the machine for making sand cores of different diameters and for use in casting articles other than pipes.

Having thus fully described my invention, what I claim as new and desire to secure by Letters Patent, is:—

1. A core making machine provided with a core box including spaced compressing members movable inward and outward with respect to the center of the core box to compress the sand around a core bar, and other members arranged between the compressing members and movable outwardly and inwardly to clear the core, and means for operating the said members.

2. A core making machine comprising a core box including a set of compressing members spaced apart and movable inwardly and outwardly, and another set of members operating between the compressing members and movable inwardly and outwardly to clear the sand core, and means for simultaneously operating the set of compressing members, and separate members for simultaneously operating the other members independently of the compressing members.

3. A core making machine comprising a core box including a set of compressing members movable inwardly and outwardly, and another set of members operating between the compressing members and movable inwardly and outwardly to clear the sand core, means for operating the second set of members and for locking the same at the limit of their inward movement, and other operating means for actuating the compressing members.

4. A core making machine comprising a core box including spaced compressing members movable inwardly and outwardly, and other members located between the compressing members and movable inwardly and outwardly to clear the core, and means for operating the second set of members and for locking the same in a fixed position at the limit of their inward movement and in spaced relation to provide passage-ways or guides for the compressing members, and means for moving the said compressing members inward through the passage-ways after the other members have been moved inward.

5. A core making machine comprising a core box including compressing members movable inwardly and outwardly and located at intervals and having inner sand-engaging faces arranged to substantially meet and completely shape a core when the compressing members are at the limit of their inward movement, and other members located between the compressing members and coöperating with the same to confine the sand in the core box until the compressing members arrive at the limit of their inward movement, and means for operating the members.

6. A core making machine comprising a core box including compressing members movable inwardly and outwardly and arranged at intervals and having inner sand-engaging faces arranged to substantially meet and completely shape a core when the compressing members are at the limit of their inward movement, and other members located between the compressing members and coöperating with the same to confine the sand in the core box and movable inwardly and outwardly to clear the sand core, and means for operating the members.

7. A core making machine comprising a core box including compressing members movable inwardly and outwardly and arranged at intervals and having inner sand-engaging faces arranged to substantially meet and completely shape a core when the compressing members are at the limit of their inward movement, and other members located between the compressing members and coöperating with the same to confine the sand in the core box and movable inwardly and outwardly to clear the sand core, means for operating the second set of members independently of the compressing members and for locking the former in spaced relation at the limit of their inward movement to form guides for the compressing members, and means for operating the latter.

8. A core making machine provided with a core box including a plurality of sand compressing members spaced apart and movable inwardly and outwardly, and a plurality of guiding members located between the compressing members and arranged to form guides for the same and coöperating therewith to confine the sand in the core box, said guiding members being movable to clear the sand core.

9. A core making machine provided with a core box including a plurality of compressing members movable inwardly and outwardly and having arcuate sand engaging faces arranged to meet and form a complete cylindrical core mold when the compressing members are at the limit of their inward movement, and spaced guiding members arranged between the compressing members and forming guides for the same and coöperating therewith to confine the sand within the core box until the compressing members reach the limit of their inward movement.

10. A core making machine provided with a core box including spaced compressing members movable inwardly and outwardly and having inner sand-engaging faces arranged to meet and form a complete core when the compressing members are at the limit of their inward movement, and spaced angle guiding members arranged between the compressing members and each presenting flat angularly related guiding faces to the same and coöperating with the compressing members to confine the sand in the core box.

11. A core making machine provided with a core box including spaced compressing members movable inwardly and outwardly and having inner sand-engaging faces arranged to meet and form a complete core when the compressing members are at the limit of their inward movement, spaced angle guiding members arranged between the compressing members and presenting flat guiding faces to the same and coöperating with the compressing members to confine the sand in the core box, means for operating the compressing members, and separate means for moving the angle members inward prior to the compressing movement of the other members and for moving the angle members outward before the releasing movement of the compressing members is effected.

12. A core making machine provided with a core box including spaced compressing members movable inwardly and outwardly and having flat side faces, and spaced angle members provided with flat guiding faces and movable inwardly and outwardly to arrange them to form guides for the compressing members and to carry them clear of the core.

13. A core making machine provided with a core box composed of diametrically arranged compressing members provided with flat side faces and having inner sand-engaging faces arranged to meet and completely shape a core, and diagonally arranged guiding members having flat guiding faces arranged at right angles to each other and adapted when the angle members are at the limit of their inward movement to fit against the flat faces of the compressing members for guiding the latter.

14. A core making machine provided with a core box including movable members having contiguous flat faces, one of the members being provided with a groove or channel arranged to receive the sand or grit, and means for operating the members.

15. A core making machine provided with a core box including movable members having contiguous flat faces, one of the members being provided with a plurality of longitudinal channels arranged to receive the sand or grit, and means for operating the members.

16. A core making machine including a plurality of spaced guiding members movable inwardly and outwardly, toggle levers connected with the guiding members for actuating the same and for locking the guiding members at the limit of their inward movement, and a plurality of compressing members movable through the spaces between the guiding members.

17. A core making machine including a plurality of spaced guiding members movable inwardly and outwardly, toggle levers connected with the guiding members for actuating the same and for locking the guiding members at the limit of their inward movement, a plurality of compressing members movable through the spaces between the guiding members, and cylinders having plungers connected with the compressing members.

18. A core making machine comprising a core box including spaced guiding members movable inwardly and outwardly, and compressing members operable through the spaces between the guiding members, toggle levers arranged in sets and located at intervals and connected with the guiding members for actuating the same and for locking the guiding members at the limit of their inward movement, cylinders having pistons connected with the sets of toggle levers for simultaneously straightening and breaking the same, and means for operating the compressing members.

19. A core making machine comprising a core box including spaced guiding members movable inwardly and outwardly, and compressing members operable through the spaces between the guiding members, toggle levers arranged in sets and located at intervals and connected with the guiding members for actuating the same and for locking the guiding members at the limit of their inward movement, rods connecting the toggle levers of each set and provided with arms, cylinders having pistons connected with the arms for simultaneously actuating the connecting rods, and means for operating the compressing members.

20. A core making machine comprising a vertical core box including spaced guiding members, and compressing members operable through the spaces between the guiding members, horizontal toggle levers connected with the guiding members for actuating the same and for locking the said guiding members in their guiding position, vertical rods connecting the toggle levers, cylinders having vertically movable pistons connected with the rods, and means for actuating the compressing members.

21. A core making machine comprising a vertical core box including spaced guiding members, and compressing members operable through the spaces between the guiding members, horizontal toggle levers connected with the guiding members for actuating the same and for locking the said guiding members in their guiding position, vertical rods connecting the toggle levers, cylinders having vertically movable pistons connected with the rods, and other cylinders having horizontally movable plungers for actuating the compressing members.

22. A core making machine comprising a vertical core box having a movable member, a plurality of horizontal toggles connected with the member and arranged at intervals, a vertical rod connecting the toggles, and a vertical cylinder having a piston connected with the rod at the lower portion thereof, said cylinder being provided with legs straddling the lowermost toggle.

23. A core making machine comprising a core box including a movable member, a plurality of toggles arranged at intervals and connected at one end to the movable member and pivoted at the other end to a fixed support and having longitudinally adjustable sections, and means connected with the toggles at an intermediate point for straightening and breaking the same in unison.

24. A core making machine comprising a frame provided at intervals with horizontal supporting plates having projecting portions forming shoulders, a vertical core box extending through the said plates and including a movable member, brackets mounted on the movable member and on the shoulders of the projecting portions of the frame, toggles connected with the brackets, and a rod connecting the toggles for operating the same in unison.

25. A core making machine comprising a core box including a movable member, a cylinder having a plunger for actuating the movable member, and an adjustable abutment interposed between the plunger and the movable member.

26. A core making machine comprising a core box including a movable member, a cylinder having a plunger for actuating the movable member, and an adjustable substantially wedge-shaped abutment interposed between the plunger and the member.

27. A core making machine comprising a core box including a movable member, a cylinder having a plunger for actuating the movable member, a wedge-shaped abutment interposed between the plunger and the movable member and slidably connected with the latter, and means for adjusting the abutment.

28. A core making machine comprising a core box having a movable member, a cylinder having a plunger for actuating the member, means for connecting the plunger with the movable member, said means permitting a limited independent movement of the plunger, and an adjustable abutment for controlling such independent movement.

29. A core making machine comprising a core box having a movable member, a bracket mounted on the movable member, a cylinder having a plunger, means carried by the plunger and connected with the bracket and having a limited movement independent of the member, and an adjustable abutment interposed between the plunger and the member for controlling such independent movement.

30. A core making machine comprising a core box including a movable member, a cylinder having a plunger for actuating the movable member, a wedge-shaped abutment interposed between the plunger and the movable member and provided with a projecting portion having an opening, and an adjusting screw operating in the opening of the projecting portion of the abutment for adjusting the latter.

31. A core making machine comprising a core box including a movable member, a block mounted on the movable member and provided with a dove-tailed groove, a cylinder having a plunger for actuating the movable member, and an adjustable abutment interposed between the member and the plunger and having a dove-tailed portion slidable in the dove-tailed groove of the block.

32. A core making machine comprising a core box including a movable member, a bracket carried by the movable member, a cylinder having a plunger for actuating the movable member, and a screw carried by the plunger and provided with a head and having a projecting stem extending through the bracket, and a nut mounted on the stem and arranged within the bracket in spaced relation with the head of the screw.

33. A core making machine comprising a core box including a movable member, a bracket carried by the movable member, a cylinder having a plunger for actuating the movable member, and a screw carried by the plunger and provided with a head and having a projecting stem extending through the bracket, a nut mounted on the stem and arranged within the bracket in spaced relation with the head of the screw, and an adjustable abutment carried by the member and arranged in the path of the screw.

34. A core making machine comprising a frame provided with a plurality of horizontal supports, a vertical core box including a movable member, a plurality of cylinders mounted on the supports of the frame and having plungers connected with the movable member, and means for simultaneously operating the plungers.

35. A core making machine comprising a frame provided with a plurality of horizontal supports, a vertical core box including a movable member, cylinders mounted on the horizontal supports and provided with plungers for actuating the movable member, means for connecting the plungers with the movable member to permit a limited independent movement of the former, adjustable abutments mounted on the movable member and interposed between the same and the plungers, and means for simultaneously operating the latter.

36. A core making machine comprising a frame provided with a plurality of horizontal supports, a vertical core box composed of spaced compressing members movable inwardly and outwardly, and guiding members arranged between the compressing members and also movable inwardly and outwardly, horizontal cylinders mounted on the supports and having plungers connected with the compressing members, toggles located at the said supports and connected with the same and with the guiding members, rods connected with the toggles for simultaneously straightening and breaking the same, and vertical cylinders having pistons connected with the rods.

37. In a core making machine, the combination of a frame comprising a bed plate having a socket arranged to receive the lower end of a core bar to support the same in a vertical position, and a plurality of spaced horizontal supporting plates located above the bed plate and having alined openings, a core box including movable members operating in the said openings, and means supported by the said plates and connected with the movable members of the core box at spaced points along the same for operating the said members.

38. A core making machine comprising a frame provided at the bottom with a bed plate having an open downwardly tapered socket arranged to receive the lower tapered end of a core bar for supporting the same in a vertical position, a core box including movable members arranged in spaced relation with the socket, and means for operating the movable members.

39. A core making machine comprising a frame having a tapered socket and provided thereat with a removable bushing adapted to receive the lower tapered end of a core bar, a removable face plate having an opening corresponding with the socket, said plate extending over the upper edges of and engaging the bushing, a vertical core box having movable members arranged in spaced relation with the socket, and means for operating the movable members.

40. A core making machine comprising a frame, a vertical core box including movable members, and means for supporting a core bar in a vertical position within the core box, said frame being provided at the lower end of the core box with a plurality of openings for the escape of the sand.

41. A core making machine comprising a frame, a vertical core box including movable members, and means for supporting a core bar in a vertical position within the core box, said frame being provided at the lower end of the core box with a plurality of openings and having grooves extending inwardly and forming channels for the escape of the sand.

42. A core making machine comprising a frame provided at the bottom with a core bar-receiving socket and having an annular series of openings spaced from the socket, said frame being also provided with grooves or gutters extending inwardly from the openings and terminating adjacent to the socket and provided with inclined bottoms, a vertical core box including movable members, and means for operating the same.

43. A core making machine including a vertical core box having movable compressing and guiding members, horizontal cylinders having plungers for operating the compressing members, vertical cylinders provided with pistons, mechanism connected with the pistons of the vertical cylinders for operating the guiding members of the core box, means for simultaneously operating the plungers including a controlling valve, and pipe connections extending from the valve to the horizontal cylinders, and separate means for operating the vertical cylinders comprising a valve, and pipe connections between the same and the vertical cylinders.

In testimony, that I claim the foregoing as my own, I have hereto affixed my signature in the presence of two witnesses.

JAMES R. McWANE.

Witnesses:
J. W. BEMIS,
R. B. WILSON.